UNITED STATES PATENT OFFICE.

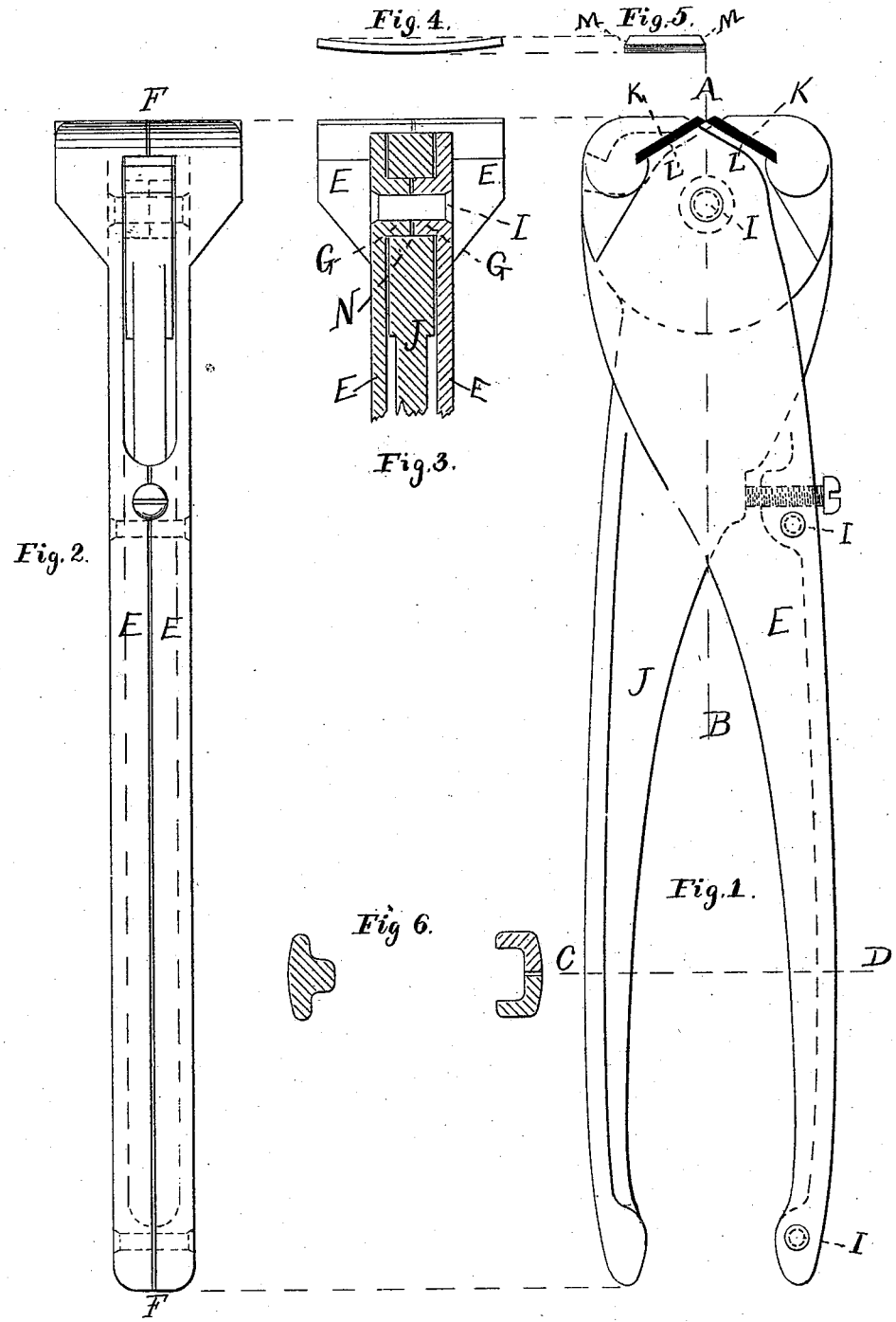

GEORGE W. HUBBARD, OF WINDSOR, VERMONT.

NIPPERS.

SPECIFICATION forming part of Letters Patent No. 287,437, dated October 30, 1883.

Application filed March 14, 1883. (No model.)

*To all whom it may concern:*

Be it known that I, GEORGE W. HUBBARD, of Windsor, in the county of Windsor and State of Vermont, have invented certain new and useful Improvements in Nippers; and I do hereby declare the following to be a full, clear, and exact description of the invention, such as will enable others skilled in the art to which it appertains to make and use the same.

My invention relates to an improvement in wire-working tools, and more particularly to nippers for cutting wire rivets, and for other kindred uses. Heretofore articles of this character have generally consisted of two wrought-iron levers fulcrumed upon a rivet extending through and uniting them. Nippers so constructed are, however, objectionable on account of the expense and difficulty attending their manufacture, the forging of their joint or fulcrum portions being especially difficult. The steel cutters of the nippers have been attached to the levers in several different ways, all of which involve objections. Most commonly they have been secured in place by welding; but this method is objectionable not only on account of the danger it involves of overheating and burning them, but also on account of the difficulty of removing and replacing them when worn out. The cutters have also been attached to the levers by screws, this mode being objectionable on account of the liability of the screws to break and wear loose; and on account of the expense involved in manufacturing the cutters with sufficient exactness to be interchangeable. Another method of securing the cutters in place consists in inserting them in dovetail grooves formed in the levers of the nippers, this method being objectionable on account of the expense involved in adapting the levers to receive the cutters, on account of the expense of manufacturing the cutters so that they can be duplicated when worn out, and on account of their liability to work loose. With the end of obviating the objections above recited, and of producing an article which shall combine simplicity and cheapness of construction with durability and efficiency in use, my invention consists in cutting-nippers, one lever of which is composed of two longitudinal sections arranged to be secured together, and each provided with a boss adapted to fit in the opposite ends of a hole in the other lever and form the fulcrum of the nippers.

My invention further consists in the combination, with the levers of cutting-nippers, said levers being provided with recesses, of removable bowed cutters slightly narrower than the width of the said recesses, and held in place therein by the effort which they exert to resume their bowed shape.

My invention further consists in certain details of construction and combinations of parts, as will be hereinafter described, and pointed out in the claims.

In the accompanying drawings, Figure 1 is a view in side elevation of a device embodying my invention. Fig. 2 is a view thereof in end elevation. Fig. 3 is a view in vertical section through the line A B of Fig. 1. Figs. 4 and 5 are respectively detached views in side elevation of one of the cutters employed with my improved device, and Fig. 6 is a view in transverse section through the line C D of Fig. 1.

My device consists of two levers, respectively designated by E and J, the former being composed of two counterpart longitudinal sections. These sections are perforated at suitable points for the reception of rivets I, by means of which they are secured together. Two perforated circular projections or bosses, G, formed integral with the sections E, constitute the fulcrum upon which the device is operated, said bosses being adapted to fit into the opposite sides of a suitable hole, N, formed in the lever J, and being held in place within it by means of one of the rivets I. In virtue of constructing the levers as described, opportunity is given of finishing them very carefully and with the expenditure of comparatively little labor, while by forming the fulcrum integral with one of the levers additional strength and durability are insured. The recesses K, for the reception of the removable cutters M, are slightly wider than the same, and have appropriate relative inclination to form the desired angle between the cutting-edges, and of these it is to be said that both edges of the cutters are beveled, to form cutting-edges, whereby they are rendered reversible, edge for edge.

Previous to the operation of hardening and tempering the cutters they are bowed longitudinally, as shown in Fig. 4 of the drawings. When, however, they are inserted in the recesses aforesaid, they are very nearly straightened, the constant effort exerted by them to resume their bowed shape effectually operating to retain them in place. In virtue of this construction the cutters are readily reversed, edge for edge, and replaced. When employed in cutting an object, the pressure thrown upon the cutters will tend to force them more firmly and exactly into the recesses.

I would have it understood that I do not limit myself to the exact construction shown and described, but hold myself at liberty to make such slight changes and alterations as fairly fall within the spirit and scope of my invention.

Having fully described my invention, what I claim as new, and desire to secure by Letters Patent, is—

1. Cutting-nippers having one lever composed of two longitudinal sections secured together, each section being provided with a boss fitting in the opposite ends of a hole in the other lever and forming the fulcrum of the nippers, substantially as set forth.

2. Cutting-nippers having one lever composed of two longitudinal counterpart sections secured together, each section being provided with a perforated boss fitting in the opposite ends of a hole in the other lever and forming the fulcrum of the nippers, and a rivet passed through the perforation of both bosses, substantially as set forth.

3. In cutting-nippers, the combination, with the levers thereof, provided with the described recesses, of removable bowed cutters slightly narrower than the width of the said recesses, and held in place therein by the effort which they exert to resume their bowed shape, substantially as set forth.

4. In cutting-nippers, the combination, with the levers thereof, provided with the described recesses, of reversible cutters bowed longitudinally and slightly narrower than the said recesses, and held in place therein by the effort which they exert to resume their bowed shape, substantially as set forth.

In testimony whereof I have signed this specification in the presence of two subscribing witnesses.

GEORGE W. HUBBARD.

Witnesses:
  WILLIAM BATCHELDER,
  HORACE P. McCLARY.